United States Patent
Nakayama et al.

(10) Patent No.: US 9,533,417 B2
(45) Date of Patent: Jan. 3, 2017

(54) HUMAN INTERACTIVE TYPE ROBOT SYSTEM

(71) Applicant: FANUC Corporation, Yamanashi (JP)

(72) Inventors: Kazutaka Nakayama, Yamanashi (JP); Takashi Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/937,878

(22) Filed: Nov. 11, 2015

(65) Prior Publication Data
US 2016/0167231 A1 Jun. 16, 2016

(30) Foreign Application Priority Data
Dec. 11, 2014 (JP) ................. 2014-251247

(51) Int. Cl.
*G06F 19/00* (2011.01)
*B25J 9/16* (2006.01)

(52) U.S. Cl.
CPC ............ *B25J 9/1676* (2013.01); *B25J 9/1694* (2013.01); *Y10S 901/09* (2013.01)

(58) Field of Classification Search
None
See application file for complete search history.

(56) References Cited

FOREIGN PATENT DOCUMENTS

| JP | 8-39467 A | 2/1996 |
|----|-----------|--------|
| JP | 2007-30496 A | 2/2007 |
| JP | 4643619 B | 3/2011 |
| JP | 2011-93011 A | 5/2011 |
| JP | 2013-83547 A | 5/2013 |
| JP | 2014-14902 A | 1/2014 |
| JP | 2014-18931 A | 2/2014 |
| JP | 2014-113659 A | 6/2014 |
| JP | 2014-159967 A | 9/2014 |
| WO | 2014/036549 A2 | 3/2014 |

*Primary Examiner* — Bhavesh V Amin
(74) *Attorney, Agent, or Firm* — Hauptman Ham, LLP

(57) ABSTRACT

A human-interactive type robot system which can constantly detect a contact force at a high precision even if the contact force is small, comprising a force sensor which measures a force which the robot receives from the outside and outputs a measurement value, a force detection value calculating part which subtracts a correction value from the measurement value to calculate a force detection value, and a correction value updating part which updates a force detection value when a predetermined condition stands for use as the correction value. The predetermined condition is that the robot is stopped or operating at a fixed speed and a margin of fluctuation of the force detection value at a predetermined unit time is a fluctuation margin threshold value or less or that the robot is stopped and the current force detection value is the force detection value threshold value or less.

13 Claims, 9 Drawing Sheets

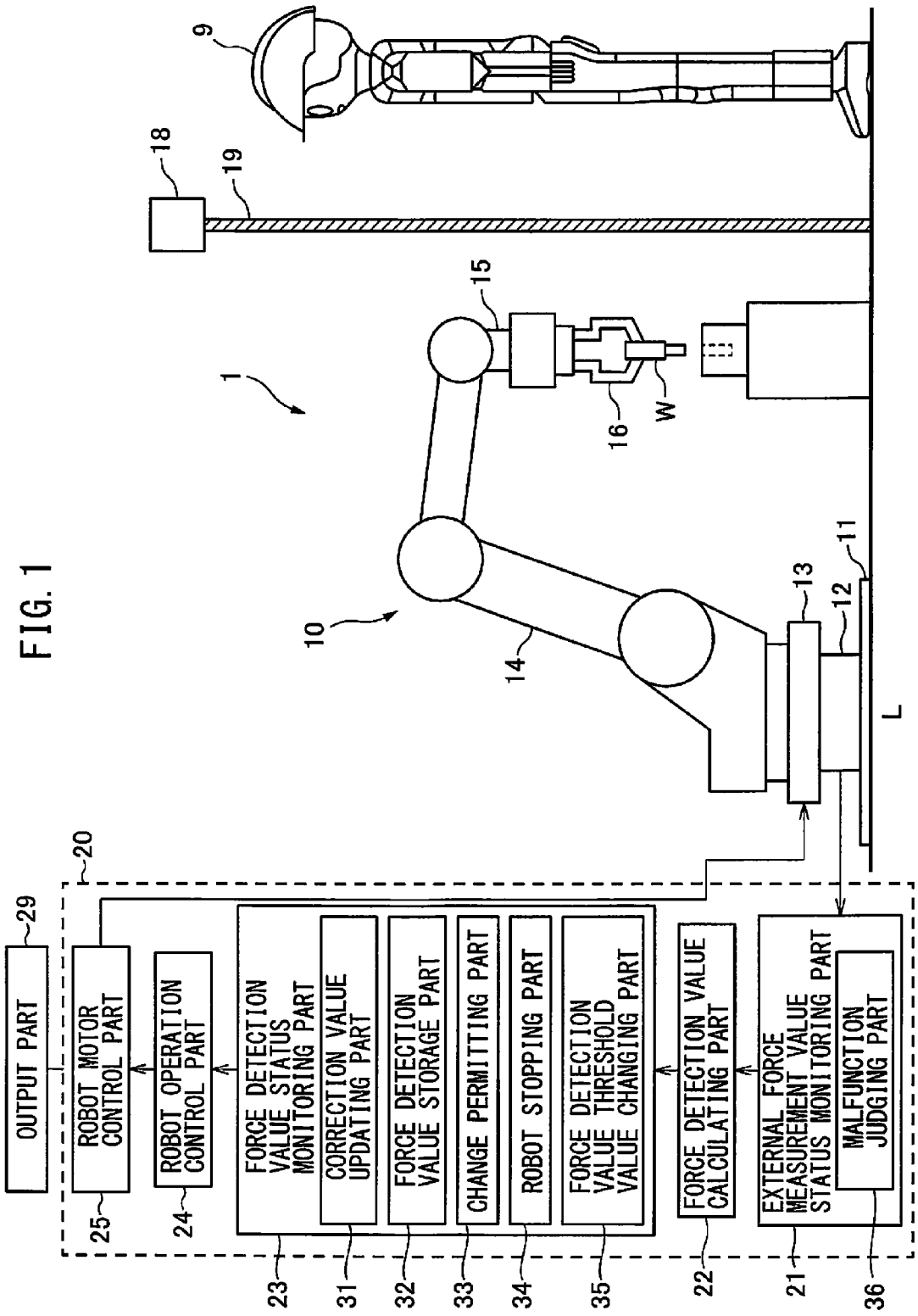

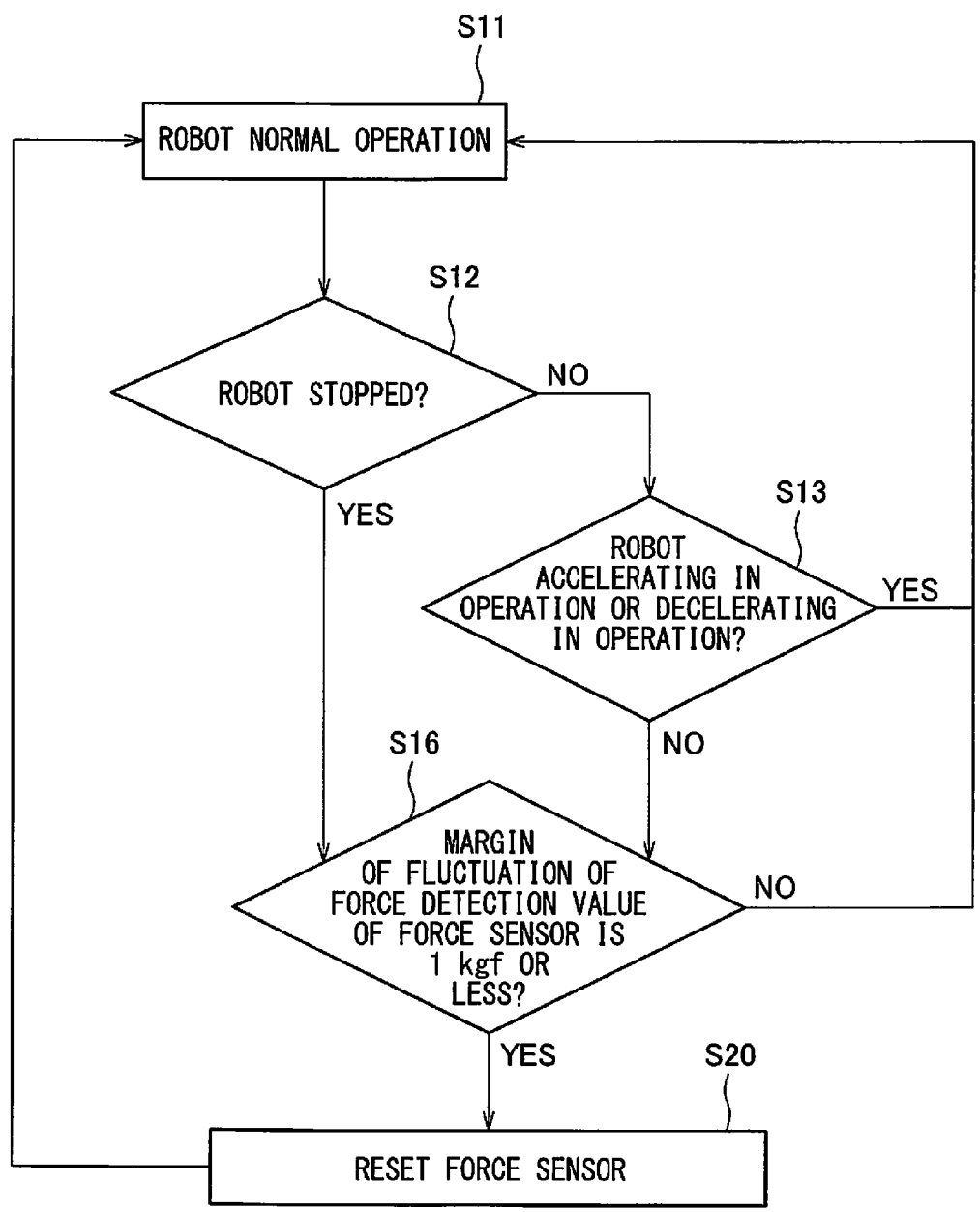

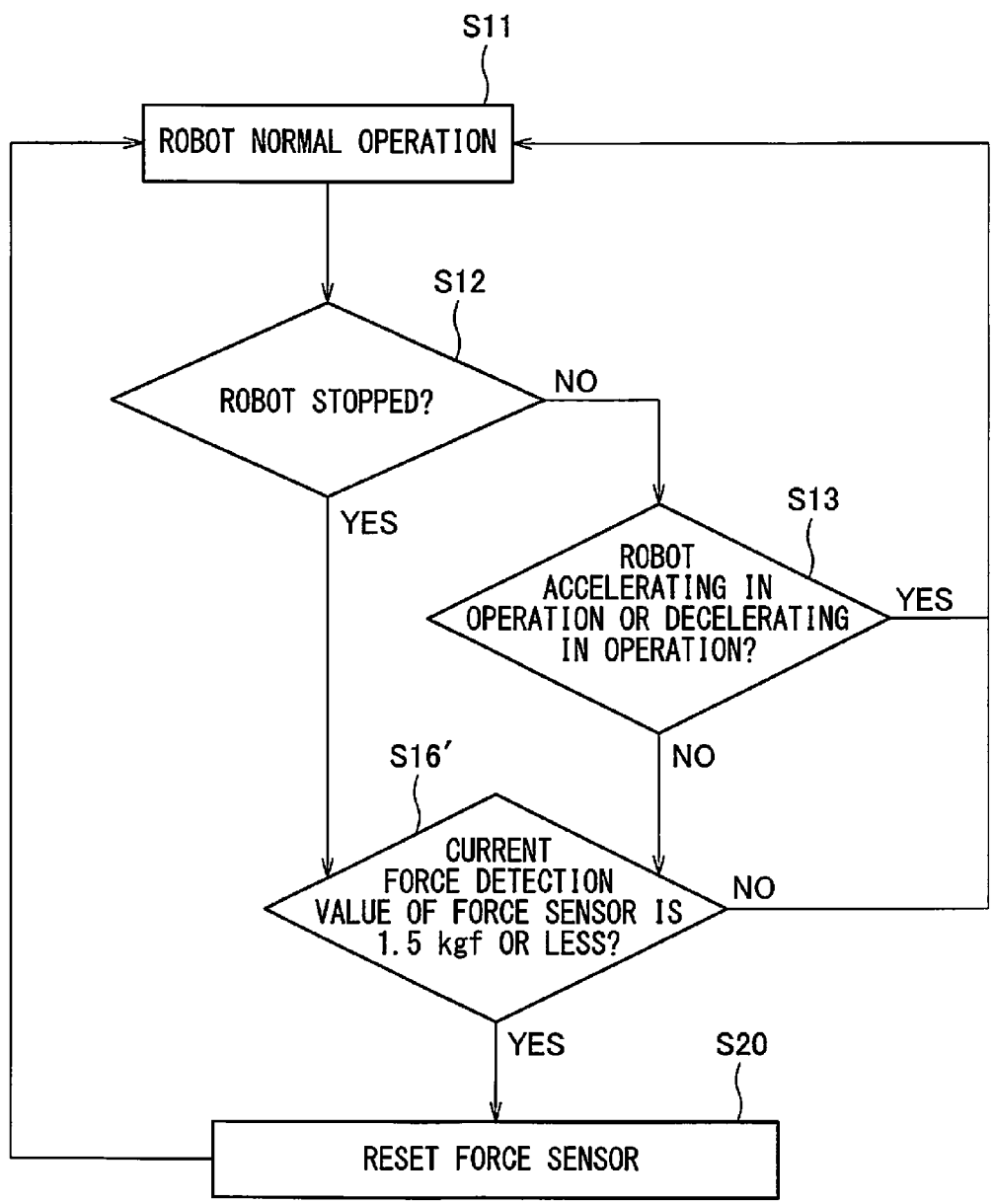

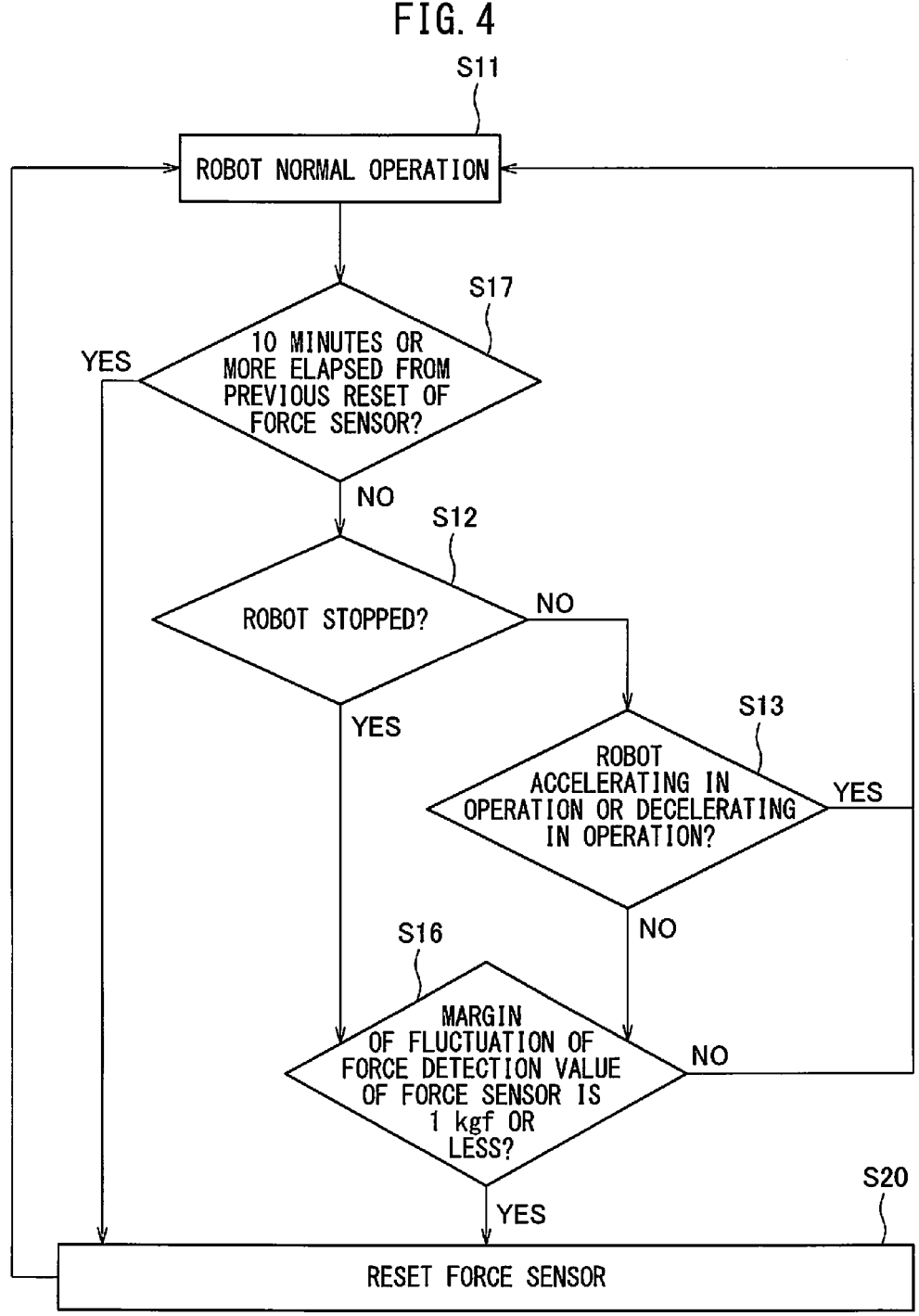

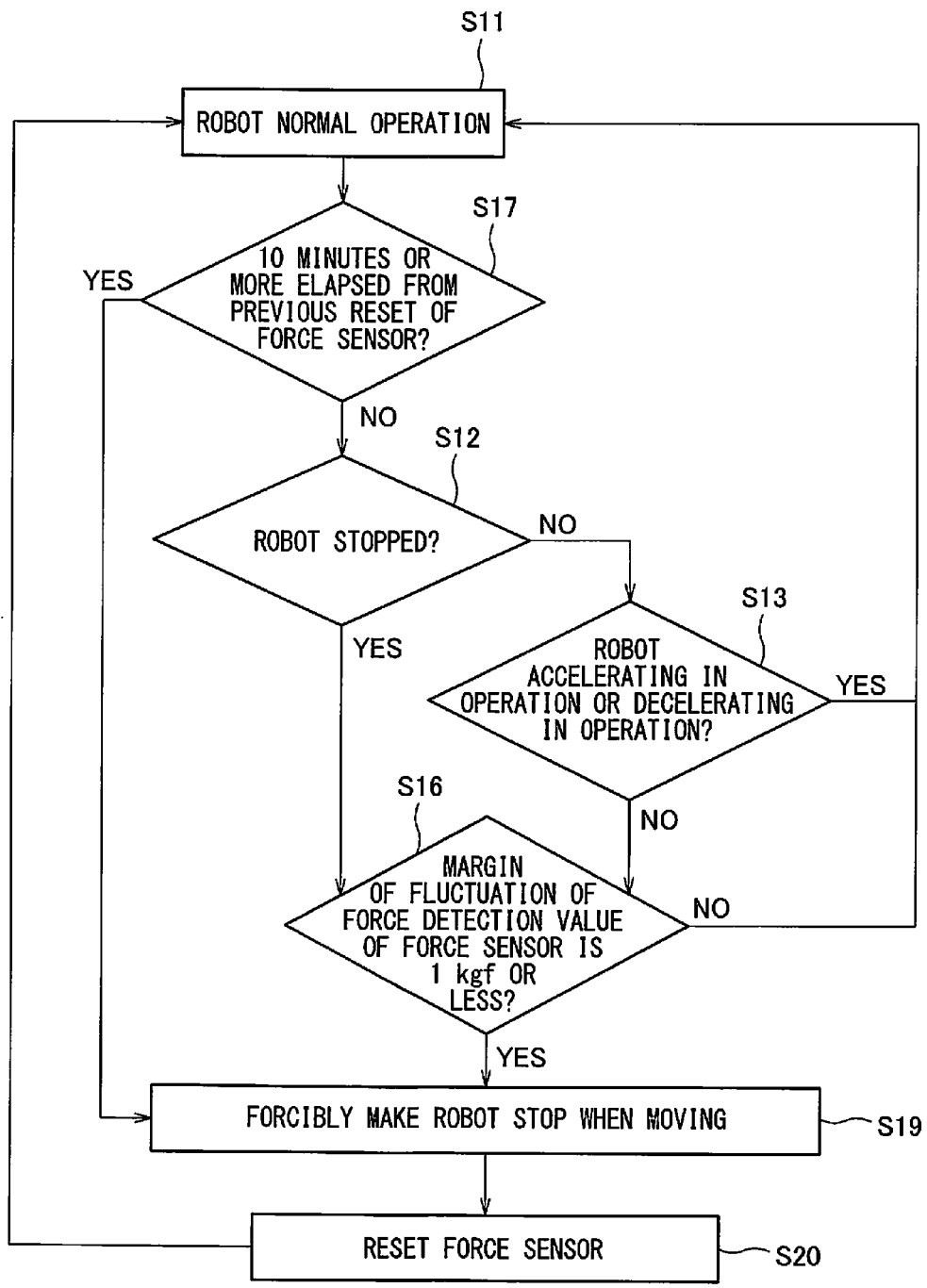

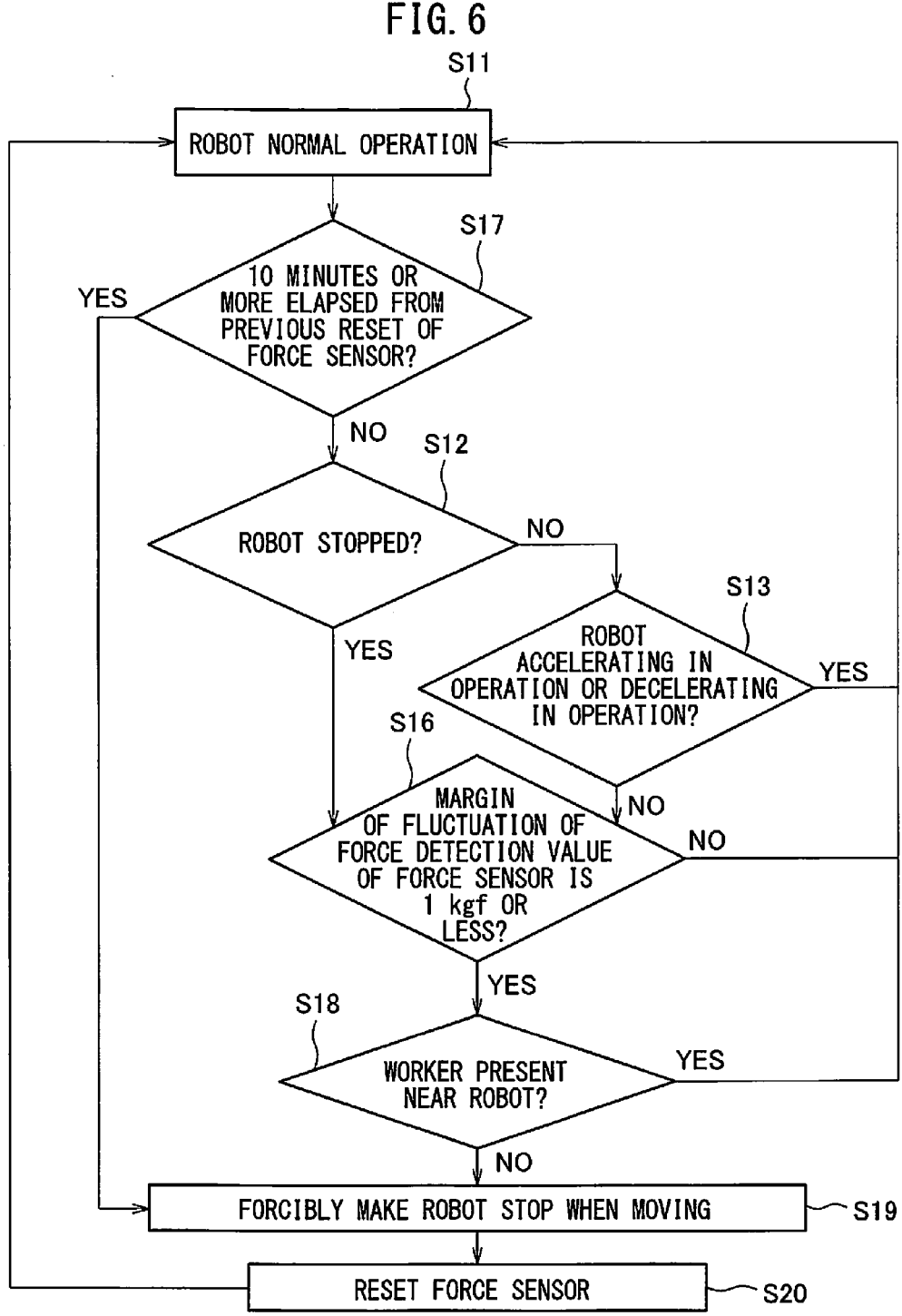

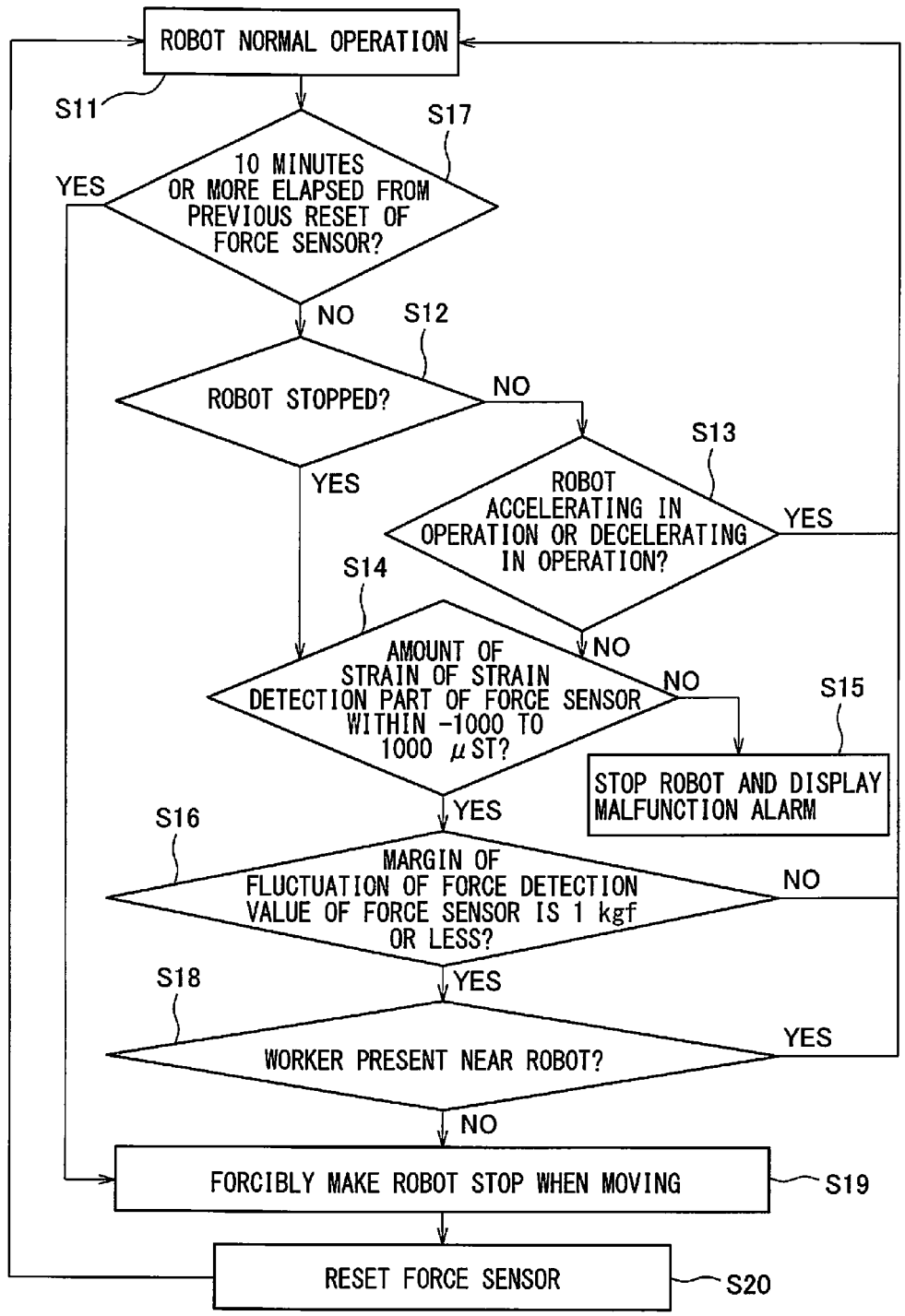

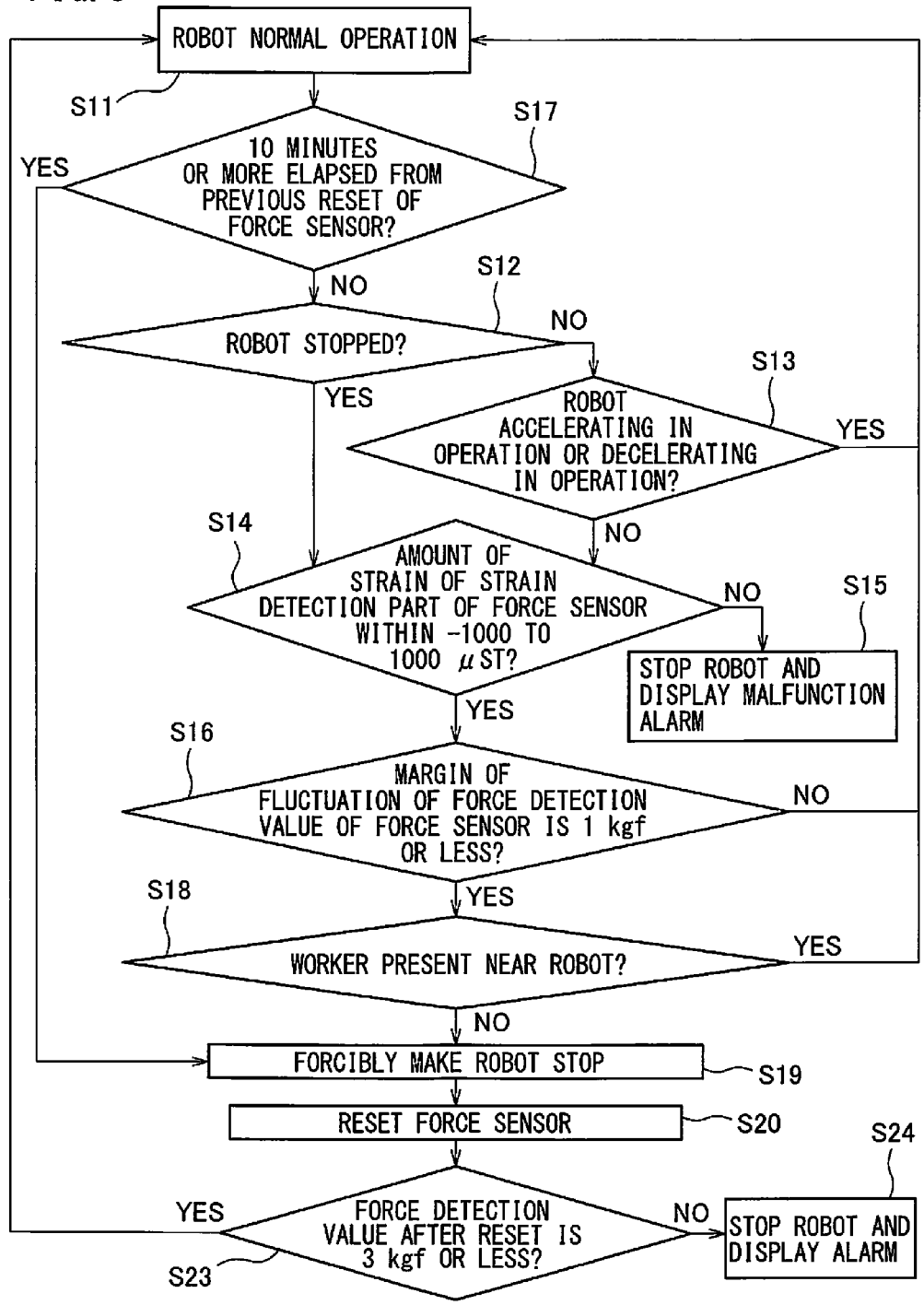

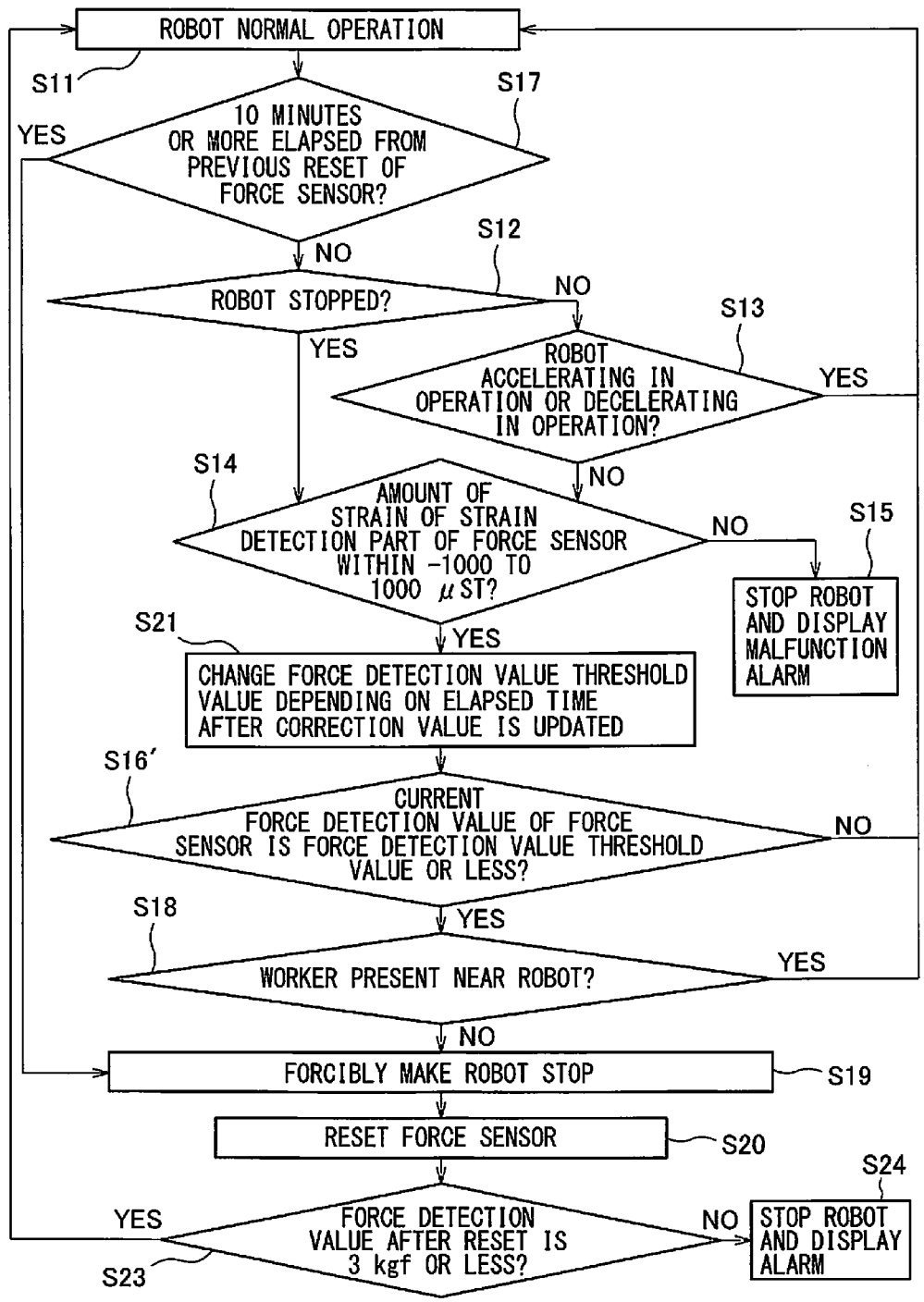

HUMAN INTERACTIVE TYPE ROBOT SYSTEM

RELATED APPLICATIONS

The present application claims priority to Japanese Application Number 2014-251247, filed Dec. 11, 2014, the disclosure of which is hereby incorporated by reference herein in its entirety.

BACKGROUND OF THE INVENTION

1. Field of the Invention

The present invention relates to a human-interactive type robot system where a robot and a worker simultaneously share the same work space to perform interactive work.

2. Description of the Related Art

General industrial robots perform work in spaces which are surrounded by safety fences so as to ensure the safety of workers. In recent years, demand has been increasing for human-interactive type robot systems which perform work sharing the same work space as workers.

In work which uses a human-interactive type robot, sometimes the robot and a worker perform separate work in a shared work space and sometimes a worker performs work on a workpiece which is held by the robot. In such a human-interactive type robot, since the worker and robot share the work space, the robot might contact the worker and injure the worker.

For this reason, the contact force between the robot and a worker is detected by a force sensor. When the detected contact force exceeds a predetermined threshold value, the robot is made to stop or the robot is made to operate so that the contact force becomes smaller to thereby ensure the safety of the worker. To reduce the danger to a worker, the threshold value of the contact force is preferably set to as small a value as possible.

For example, Japanese Patent Publication No. 8-39467A discloses a method of using a force sensor which is set at an end effecter of an industrial robot to detect a contact force to detect whether the end effecter has contacted a workpiece. Further, Japanese Patent No. 4643619 discloses that a change of temperature or aging of the force sensor causes a signal of the force sensor to change and discloses to correct the resultant drift which is included in the force detection value. Furthermore, Japanese Patent Publication No. 2007-30496 discloses to correct the drift which is included in the output from a strain detection device which was provided in a clamping device of a molding machine and to thereby detect the clamping force with a higher precision.

In this regard, a force sensor often includes a strain gauge. It uses the strain gauge to detect the amount of strain, converts the amount to force, and detects the direction and magnitude of the acting load. A strain gauge is generally attached by an adhesive to part of the body of the force sensor.

However, it is known that even if the same magnitude of force acts, the creep accompanying aging of a binder layer which is formed by an adhesive, a change of temperature, a change of humidity, etc. sometimes cause the amount of strain converted to value of force to include considerable drift from the actual value. In such a case, if the amount of strain which is additionally generated due to the above factors becomes larger, the drift also becomes larger. For this reason, the situation can arise where the force sensor will not recognize a contact force unless a certain degree of large contact force acts. If in this way the contact force which the force sensor can recognize becomes larger, there is a greater possibility that a worker will be endangered. Therefore, it is desirable that as small as possible a contact force can be detected with a high precision. Note that, sometimes even with other designs of force sensors, the detection value will similarly change along with the elapse of time.

The present invention was made in consideration of such a situation and has as its object the provision of a human-interactive type robot system which can detect a contact force by a high precision at all times even if the contact force by which a robot contacts a worker is small.

SUMMARY OF THE INVENTION

To achieve the above object, according to a first aspect of the invention, there is provided a human-interactive type robot system wherein a robot and a worker share a work space to perform interactive work, comprising a force sensor which measures a force which the robot receives from the outside and outputs a measurement value, a force detection value calculating part which subtracts a correction value from the measurement value to calculate a force detection value, and a correction value updating part which updates a force detection value when a predetermined condition stands for use as the correction value, wherein, the predetermined condition being that the robot is stopped or operating at a fixed speed and the margin of fluctuation of the force detection value at a predetermined unit time is a fluctuation margin threshold value or less.

According to a second aspect of the invention, there is provided a human-interactive type robot system wherein a robot and a worker share a work space to perform interactive work, comprising a force sensor which measures a force which the robot receives from the outside and outputs a measurement value, a force detection value calculating part which subtracts a correction value from the measurement value to calculate a force detection value, and a correction value updating part which updates a force detection value when a predetermined condition stands for use as the correction value, wherein, the predetermined condition being that the robot is stopped or operating at a fixed speed and the current force detection value is a force detection value threshold value or less.

According to a third aspect of the invention, there is provided the first or second aspect of the invention further comprising a force detection value storage part which stores a force detection value when the predetermined condition stands, and, when the correction value is not updated for a predetermined time, the correction value updating part updates the force detection value which is stored in the force detection value storage part for use as the correction value.

According to a fourth aspect of the invention, there is provided the first or second aspect of the invention which further forcibly makes the robot stop or operate at a fixed speed to make the correction value updating part update the correction value when the correction value is not updated for a predetermined time.

According to a fifth aspect of the invention, there is provided any one of the first to fourth aspects of the invention further comprising a human detecting part which detects if the worker is present near the robot and an update permitting part which permits updating of the correction value by the correction value updating part when the human detecting part detects there is no worker near the robot.

According to a sixth aspect of the invention, there is provided any one of the first to fifth aspects of the invention further comprising a malfunction judging part which monitors if an amount of strain which a strain detection part which is included in the force sensor detects falls within a predetermined suitable range and judges that the force sensor is malfunctioning when it does not fall in the suitable range.

According to a seventh aspect of the invention, there is provided any one of the first to sixth aspects of the invention further comprising a robot stopping part which makes the robot decelerate or stop when a force detection value after being updated by the correction value updating part exceeds a stopping threshold value.

According to an eighth aspect of the invention, there is provided any one of the second to seventh aspects of the invention further comprising a force detection value threshold changing part which changes the force detection value threshold value in accordance with an elapsed time from when the correction value updating part updates the correction value.

These objects, features, and advantages and other objects, features, and advantages of the present invention will be understood more clearly from the detailed description of typical embodiments shown in the attached drawings.

BRIEF DESCRIPTION OF THE DRAWINGS

FIG. 1 is a side view of a human-interactive type robot system in the present invention.

FIG. 2 is a flow chart which shows the operation of a human-interactive type robot system based on a first embodiment of the present invention.

FIG. 3 is a flow chart which shows the operation of a human-interactive type robot system based on a second embodiment of the present invention.

FIG. 4 is a flow chart which shows the operation of a human-interactive type robot system based on a third embodiment of the present invention.

FIG. 5 is a flow chart which shows the operation of a human-interactive type robot system based on a fourth embodiment of the present invention.

FIG. 6 is a flow chart which shows the operation of a human-interactive type robot system based on a fifth embodiment of the present invention.

FIG. 7 is a flow chart which shows the operation of a human-interactive type robot system based on a sixth embodiment of the present invention.

FIG. 8 is a flow chart which shows the operation of a human-interactive type robot system based on a seventh embodiment of the present invention.

FIG. 9 is a flow chart which shows the operation of a human-interactive type robot system based on an eighth embodiment of the present invention.

DETAILED DESCRIPTION

Below, embodiments of the present invention will be explained with reference to the attached drawings. In the following drawings, similar members are assigned similar reference notations. To facilitate understanding, these figures are suitably changed in scale.

FIG. 1 is a side view of a human-interactive type robot system in the present invention. In the human-interactive type robot system 1 which is shown in FIG. 1, to perform interactive work, a worker 9 and a robot 10 are present at positions close to each other.

In FIG. 1, the robot 10 is a vertical multi-articulated manipulator. At the front end of the robot arm 14, a robot wrist flange 15 is attached. Further, at the front end of the robot wrist flange 15, a gripping hand 16 is provided. The gripping hand 16 of the robot 10 grips a workpiece W which is present at a predetermined position. The robot 10 makes the workpiece W move to a target location, then releases the workpiece W.

As shown in FIG. 1, a fastening plate 11 is fastened to a floor part L. On the fastening plate 11, a force sensor 12 is arranged. Further, on the force sensor 12, a robot base 13 of the robot 10 is arranged. The force sensor 12 includes inside it a strain detector, for example, a strain gauge, in particular a semiconductor strain gauge, and measures the outside force which acts on the robot 10 and outputs a measurement value. Note that, the force sensor 12 may also be attached to the robot base 13 or another part of the robot 10.

The robot 10 is connected to a robot control device 20. The robot control device 20 is a digital computer and controls the operation of the robot 10. The robot control device 20 includes an external force measurement value status monitoring part 21 which monitors an external force measurement value which the force sensor 12 detects, a force detection value calculating part 22 which subtracts a correction value from the measurement value which is output from the force sensor 12 to calculate a force detection value, and a force detection value status monitoring part 23 which constantly monitors various types of states of the force detection value.

Furthermore, the robot operation control part 24 of the robot control device 20 makes the robot 10 operate while constantly comparing the operating state of the robot 10, for example, the stopped state, accelerating state, constant speed state operating state, etc. with the fluctuating state of the force detection value at the force detection value status monitoring part 23. Furthermore, the robot motor control part 25 of the robot control device 20 controls the motors of the different axes of the robot 10 in accordance with the output from the robot operation control part 24. Further, the output part 29 which is connected to the robot control device 20 outputs an alarm when required.

As shown in FIG. 1, the force detection value status monitoring part 23 of the robot control device 20 includes a correction value updating part 31 which updates a force detection value when the predetermined condition stands for use as a correction value. The processing by the correction value updating part 31 for update of the correction value can be set to be a reset of the force sensor 12.

Furthermore, the force detection value status monitoring part 23 includes a force detection value storage part 32 which stores the force detection value when a predetermined condition stands. Note that, when the predetermined condition stands, the force detection value storage part 32 may successively store the force detection value each time the force detection value calculating part 22 calculates the force detection value.

In this connection, the predetermined condition in the first embodiment of the present invention is that the robot 10 is stopped or is operating at a fixed speed and the margin of fluctuation of the force detection value at a predetermined unit time is a fluctuation margin threshold value or less. Further, the predetermined condition in the second embodiment of the present invention is that the robot 10 is stopped or is operating at a fixed speed and the current force detection value is the force detection value threshold value or less.

Referring to FIG. 1, the human-interactive type robot system 1 includes a human detecting part 18 near the robot 10. The human detecting part 18 which is shown in FIG. 1 is an area sensor and forms a two-dimensional detection region 19. Further, the human detecting part 18 confirms if a worker 9 or other obstacle is in a detection region 19. As a matter of fact, the human detecting part 18 is connected to the robot control device 20.

Further, the force detection value status monitoring part 23 of the robot control device 20 includes an update permitting part 33 which permits updating of a correction value by a correction value updating part 31 when the human detecting part 18 detects there is no worker 9 near the robot 10.

Furthermore, the force detection value status monitoring part 23 includes a robot stopping part 34 which makes the robot 10 decelerate or stop when a force detection value after updating by the correction value updating part 31 exceeds a stopping threshold value and a force detection value threshold changing part 35 which changes a force detection value threshold value in accordance with an elapsed time from when the correction value updating part 31 updated the correction value. Note that, the robot stopping part 34 may also be included in the robot operation control part 24 of the robot control device 20.

Furthermore, the external force measurement value status monitoring part 21 of the robot control device 20 includes a malfunction judging part 36 which monitors if the amount of strain which the strain detection part which is contained in the force sensor 12 detects falls in a predetermined suitable range and, if not falling in the suitable range, judges that the force sensor 12 has malfunctioned.

FIG. 2 is a flow chart which shows the operation of a human-interactive type robot system 1 based on a first embodiment of the present invention. Below, referring to FIG. 1 and FIG. 2, the operation of the human-interactive type robot system 1 according to the first embodiment will be explained. Note that, the flow chart which is shown in FIG. 2 is one which is repeatedly performed every predetermined control period. Note that, the same is true for the other later explained flow charts.

Assume that, at step S11 of FIG. 2, the robot 10 of the human-interactive type robot system 1 is engaged in normal operation. "Normal operation" is, for example, the operation of gripping, moving, and releasing a workpiece W in accordance with a predetermined program.

Then, at step S12, it is judged if the robot 10 has stopped. If it is judged that the robot 10 has stopped, the routine proceeds to step S16, while if it is judged that the robot 10 has not stopped, the routine proceeds to step S13. At step S13, it is judged if the robot 10 is accelerating in operation or decelerating in operation. Note that, the judgment operation at steps S12, S13 is performed by the force detection value status monitoring part 23 based on a program of the robot 10, operating command, etc.

When the robot 10 is accelerating or decelerating in operation, the routine returns to step S11. When it is judged that the robot 10 is not accelerating or decelerating in operation, that is, when it is judged that the robot 10 is operating at a constant speed, the routine proceeds to step S16. If in this way the robot 10 has stopped or is operating at a constant speed, it can be judged that the robot 10 is not being acted on by an inertia force due to accelerating or decelerating operation.

Further, at step S16, the force detection value status monitoring part 23 judges if the margin of fluctuation of the force detection value of the force sensor 12 is a fluctuation margin threshold value, for example, 1 kgf or less, in a predetermined unit time, for example, 1 second. Further, when the margin of fluctuation of the force detection value is the fluctuation margin threshold value or less, the routine proceeds to step S20 where the force sensor 12 is reset. Note that, when the margin of fluctuation of the force detection value is not the fluctuation margin threshold value or less, the routine returns to step S11.

As explained above, the predetermined condition in the first embodiment of the present invention is that the robot 10 is stopped or is operating at a fixed speed and the margin of fluctuation of the force detection value at a predetermined unit time is a fluctuation margin threshold value, for example, 1 kgf, or less. In the first embodiment, when this predetermined condition stands, the force sensor 12 is reset.

Specifically, the correction value updating part 31 updates the force detection value which was output when the above-mentioned predetermined condition stands for use as a correction value. Then, the force detection value calculating part 22 subtracts the correction value from the measurement value of the current force sensor 12 to calculate the force detection value. Due to this, the force sensor 12 is reset. Therefore, when the above-mentioned predetermined condition stands, it becomes possible to make the state where no external force acts a state close to no load (0 kg).

As explained in the prior art, due to creep of the adhesive, a change of temperature, a change of humidity, etc., the measurement value of the force sensor 12 (value of amount of strain converted to force) sometimes includes drift. In the present invention, the force sensor 12 is reset, whereby it is possible to eliminate the drift. As a result, in the present invention, the force sensor 12 can be maintained in a state of high precision with little drift over a long period of time. Therefore, the force sensor 12 can detect the smallest possible force.

Further, in the first embodiment, the force sensor 12 is never reset in the state where it is acted on by an abnormally large force. Therefore, the measurement value of the force sensor 12 is never excessively corrected. For this reason, a drop in the precision of the force sensor 12 can also be simultaneously prevented.

In the prior art, the general practice is to update the correction value only when the robot 10 is stopped. As opposed to this, in the first embodiment, when the margin of fluctuation is the fluctuation margin threshold value or less, if the robot 10 is moving by a fixed speed, it is possible to judge that no inertia force due to accelerating or decelerating operation is being received. In such a case, the correction value can be updated. As a result, the correction value can be frequently updated, so the drift of the measurement value of the force sensor 12 can be constantly kept the smallest. Therefore, the precision of the force sensor 12 can be constantly maintained in a good state and the force sensor 12 can detect the smallest possible force. Therefore, it becomes possible to raise the safety of a human-interactive type robot system 1.

FIG. 3 is a flow chart which shows the operation of a human-interactive type robot system based on a second embodiment of the present invention. In the flow chart which is shown in FIG. 3, at already explained parts, repeat explanations are omitted for the purpose of avoiding overlap. The same is true for the other later explained flow charts.

In FIG. 3, instead of step S16 which is shown in FIG. 2, step S16' is arranged. At step S16', the force detection value status monitoring part 23 judges if the current force detection value of the force sensor 12 is the force detection value threshold value, for example, 1.5 kgf, or less. Further, when the current force detection value is the force detection value threshold value or less, the routine proceeds to step S20 where the force sensor 12 is reset as explained above.

The predetermined condition in the second embodiment of the present invention is that the robot 10 be stopped or operating at a fixed speed and the current force detection value be a force detection value threshold value or less. In the second embodiment, when this predetermined condition stands, the force sensor 12 is reset. In this case as well, it will be understood that substantially the same advantageous effects as explained above are obtained.

In the second embodiment, when the current force detection value is not the force detection value threshold value or less, it is judged that the robot 10 has collided with a worker 9 or a peripheral object other than a worker and is receiving a large external force. In such a case, the routine returns to step S11 where regardless of the operating state of the robot 12, updating of the correction value is avoided. Further, the correction value is updated only when the current force detection value is the force detection value threshold value or less, that is, when it is judged that the robot 10 is not receiving excessive external force from a worker 9 or a peripheral object other than a worker.

When the timing of update of the correction value is bad, the correction value becomes too large, the precision of the force sensor 12 falls, and the smallest contact force which can be recognized may increase. However, in the second embodiment, the precision of such a force sensor 12 can be kept from falling or the minimum recognizable contact force can be kept from increasing.

As a result, the risk to a worker can be reduced and the safety of the human-interactive type robot system 1 can be raised.

FIG. 4 is a flow chart which shows the operation of a human-interactive type robot system based on a third embodiment of the present invention. In FIG. 4, if it is judged at step S11 that the robot 10 is normally operating, the routine proceeds to step S17.

At step S17, the force detection value status monitoring part 23 judges if a predetermined time, for example, 10 minutes or more, has elapsed from when the force sensor 12 was previously reset. When a predetermined time or more has elapsed from the previous reset, the routine proceeds to step S20 where the force sensor 12 is reset. Note that, when a predetermined time has not elapsed from the time of the previous reset, the routine proceeds to step S12.

In this connection, the force detection value storage part 32 stores the force detection value when the predetermined condition stands. In the third embodiment, when resetting the force sensor 12, the correction value updating part 31 reads out the stored force detection value from the force detection value storage part 32. Further, the correction value updating part 31 updates this force detection value for use as a correction value in the above way.

In this way, in the third embodiment, when the force sensor 12 is not reset for a predetermined time, it is automatically reset. Due to this, it is possible to periodically update the correction value. Therefore, in the third embodiment, the reset is frequently performed, so the drift of the measurement value can constantly be kept to a minimum. For this reason, the force sensor 12 can be maintained at a high precision.

FIG. 5 is a flow chart which shows the operation of a human-interactive type robot system based on a fourth embodiment of the present invention. In the fourth embodiment, when a predetermined time, for example, 10 minutes or more, elapses from the time of the previous reset, the routine proceeds to step S19.

At step S19, the force detection value status monitoring part 23 forcibly makes the robot 10 stop and creates a situation where the robot 10 does not receive any acceleration or deceleration or any other load. Alternatively, it may forcibly make the robot 10 operate at a fixed speed. Further, at step S20, the force detection value which was calculated when the robot 10 is stopped or when it is operating at a fixed speed is used as the correction value to reset the force sensor 12. Note that, when a predetermined time or more has elapsed from the previous reset, the routine returns to step S11.

In this case as well, the force detection value status monitoring part 23 forcibly creates a situation where the robot 10 does not receive any acceleration or deceleration or any other load, acquires a suitable force detection value, and thereby periodically updates the correction value. Further, it creates a situation where the robot 10 does not receive any acceleration or deceleration or any other load, then resets the force sensor 12, so can reset the force sensor 12 at a suitable state and suitable timing. For this reason, the robot 10 can be kept from operating unexpectedly.

FIG. 6 is a flow chart which shows the operation of a human-interactive type robot system based on a fifth embodiment of the present invention. In FIG. 6, at step S16, when the margin of fluctuation of the force detection value is the fluctuation margin threshold value or less, the routine proceeds to step S18.

At step S18, the human detecting part 18, for example, the area sensor, detects whether a worker 9 or other obstacle is in the detection region 19 near the robot 10. Further, when the human detecting part 18 detects that a worker 9 etc. is not near the robot 10, the update permitting part 33 permits update of the correction value by the correction value updating part 31. Further, at step S19, the force detection value status monitoring part 23 makes the robot 10 stop or operate by a fixed speed to create a situation where the robot 10 does not receive any acceleration or deceleration or any other load. Then, at step S20, as explained above, the force sensor 12 is reset. Note that, it should be noted that the human-interactive type robot system does not necessarily require the human detecting part 18.

When resetting the force sensor 12, if mistakenly resetting the sensor without contact with a peripheral object etc. or other such situation being recognized, sometimes the correction value will become too large and the precision of the force sensor 12 will fall or the minimum recognizable contact force will become larger. In such a case, the worker can be endangered. However, in the fifth embodiment, it is confirmed there is no worker 9 near the robot, then the correction value can be updated. Therefore, it is possible to avoid endangering a worker 9 near the robot.

FIG. 7 is a flow chart which shows the operation of a human-interactive type robot system based on a sixth embodiment of the present invention. Further, the malfunction judging part 36 is made one which sets a suitable range for the amount of strain of the strain detection part which is included in the force sensor 12, for example, a strain gauge, in particular a semiconductor strain gauge, of within −1000 to 1000 μST. Further, in the sixth embodiment, step S14 is provided right before step S16.

At step S14, the malfunction judging part 36 judges if the amount of strain of the strain detecting part is in the above-mentioned suitable range. Further, the malfunction judging part 36 judges that the force sensor 12 which includes the strain gauge has malfunctioned when the amount of strain deviates from the suitable range. In this case, the routine proceeds to step S15 where an alarm indicating that the force sensor 12 is malfunctioning is output from the output part 29 and the robot 10 is made to stop. Therefore, the robot 10 can be made to quickly stop in advance and safety of the human-interactive type robot system 1 can be secured. Note that, when the amount of strain of the strain detection part is within the above-mentioned suitable range, the routine proceeds to step S16.

FIG. 8 is a flow chart which shows the operation of a human-interactive type robot system based on a seventh embodiment of the present invention. In the seventh aspect of the invention, after the force sensor 12 is reset at step S20, at step S23, the force detection value status monitoring part 23 judges if the force detection value after being updated by the correction value updating part 31 is the stopping threshold value, for example, 3 kgf, or less.

Further, when the updated force detection value is the stopping threshold value or less, the routine proceeds to step S24. In this case, there is a high possibility that the robot 10 may contact a worker 9 or that robot 10 may jam up a worker 9 or a worker 9 may otherwise be endangered. Therefore, at step S24, an alarm indicating that a worker is endangered is output from the output part 29, and the robot stopping part 34 causes the robot 10 to immediately stop or decelerate. For this reason, it will be understood that the robot system 1 is enhanced in safety. Note that, when the updated force detection value is the stopping threshold value or less, the routine returns to step S11.

FIG. 9 is a flow chart which shows the operation of a human-interactive type robot system based on an eighth embodiment of the present invention. In this regard, when the robot 10 is acted on once by a large force, the technique of the second embodiment can be used to avoid the force sensor 12 being reset. However, when the robot 10 is receiving force from the worker 9 which gradually increases but has not exceeded the detection value threshold value, the situation can arise where the force sensor 12 cannot be kept from being repeatedly reset. In such a case, if reset is repeated, the correction value becomes excessively large. As a result, the precision of the force sensor 12 falls and the possibility of the robot 10 endangering the worker 9 rises.

Therefore, in the eighth aspect of the invention, step S21 is provided between step S14 and step S16'. At step S21, the force detection value threshold changing part 35 makes the force detection value threshold value change in accordance with the time elapsed from when the correction value updating part 31 updated the correction value. For example, the force detection value threshold value at the time the correction value updating part 31 updates the correction value is 0. The force detection value threshold value increases in proportion to the elapse of time and becomes 3 kgf after 90 seconds.

When at step 16' the current force detection value of the force sensor is not the force detection value threshold value which the force detection value threshold changing part 35 changed or less, the routine returns to step S11 where updating of the correction value is avoided. In other words, in the eighth embodiment, even when the force which acts between the robot and the worker gradually becomes larger, when the speed by which the force changes is, for example, larger than 3 kgf per 90 seconds, the correction value is not updated. Therefore, as explained above, a worker 9 can be kept from being endangered.

Note that, replacing step S16 which is shown from FIG. 4 to FIG. 9 with step S16' of FIG. 2 would be obvious to a person skilled in the art. Further, suitably combining several of the above-mentioned embodiments is included in the scope of the present invention.

ADVANTAGEOUS EFFECTS OF INVENTION

In the first aspect of the invention, when the margin of fluctuation is the fluctuation margin threshold value or less, even if the robot is moving, it can be judged that the robot is not receiving any outside force from the worker. In such a case, the correction value is updated. As a result, the correction value can be frequently updated, so the drift can be constantly maintained at the minimum. Therefore, the precision of the force sensor can be constantly maintained in a good state and the smallest possible contact force can be detected. For this reason, it becomes possible to raise the safety of the human-interactive type robot system. The predetermined unit time is for example 1 second, while the fluctuation margin threshold value is for example 1 kgf.

In the second aspect of the invention, when it is judged that the robot has collided with a worker or a peripheral object other than a worker and is receiving a large external force, that is, when the current force detection value is larger than a predetermined force detection value threshold value, the correction value can be kept from being updated regardless of the operating state of the robot. If the timing of updating the correction value is bad there is the possibility that the correction value will become larger, the precision of the force sensor will fall, and the minimum recognizable contact force will increase. However, in the second aspect of the invention, such a drop in precision of the force sensor and increase in the minimum recognizable contact force can be avoided. As a result, the risk of endangering a worker can be reduced and the safety of the human-interactive type robot system can be enhanced. The force detection value threshold value is, for example, 1.5 kgf.

In the third aspect of the invention, when the correction value is not updated for a predetermined time, the stored force detection value is used, so the correction value can be periodically updated. The predetermined time is, for example, 10 minutes.

In the fourth aspect of the invention, when the correction value is not updated for a predetermined time, the robot is forcibly rendered a state in which no load acts on it so as to acquire a suitable force detection value. Therefore, the correction value can be suitably periodically updated. The predetermined time is, for example, 10 minutes.

In the fifth aspect of the invention, the correction value can be updated only when the human detecting part, for example, the area sensor, confirms there is no worker near the robot. Therefore, a worker near the robot can be kept from being endangered.

In the sixth aspect of the invention, when the amount of strain does not fall in a predetermined suitable range, it is judged that the force sensor is malfunctioning, so the robot is made to quickly stop in advance. The predetermined suitable range is for example −1000 μST to 1000 μST.

In the seventh aspect of the invention, when the updated force detection value exceeds the stopping threshold value, it can be judged that there is a high possibility of the robot contacting a worker or colliding with a worker. Therefore, by making the robot stop or decelerate, the safety of the robot system is enhanced. The stopping threshold value is, for example, 3 kgf.

When a large force instantaneously acts between a robot and worker, according to the second aspect of the invention, the correction value can be kept from being updated. However, when the force acting between the robot and worker gradually becomes greater, the situation may arise where the correction value cannot be kept from being updated. In such a case, the correction value becomes too large and as a result there is a possibility of the precision of detection of the force sensor falling and a worker being endangered. In the eighth aspect of the invention, the force detection value threshold value is changed in accordance with the elapsed time from when the correction value updating part updates the correction value, so such a situation is avoided. For example, the force detection value threshold value at the time the correction value updating part updates the correction value is 0. The force detection value threshold value increases in proportion to the elapse of time and becomes 3 kgf after 90 seconds. In this example, if the force which acts between the robot and the worker gradually becomes larger, when the speed by which the force changes is larger than 3 kgf per 90 seconds, the correction value is not updated.

Typical embodiments were used to explain the present invention, but a person skilled in the art would understand that the above-mentioned changes and various other changes, deletions, and additions may be made without departing from the scope of the present invention.

What is claimed is:

1. A human-interactive type robot system wherein a robot and a worker share a work space to perform interactive work, comprising
   a force sensor which measures a force which said robot receives from the outside and outputs a measurement value,
   a force detection value calculating part which subtracts a correction value from said measurement value to calculate a force detection value, and
   a correction value updating part which updates a force detection value when a predetermined condition stands for use as said correction value,
   wherein, said predetermined condition being that said robot is stopped or operating at a fixed speed and a margin of fluctuation of the force detection value at a predetermined unit time is a fluctuation margin threshold value or less.

2. The human-interactive type robot system according to claim 1,
   further comprising a force detection value storage part which stores a force detection value when said predetermined condition stands, and,
   when said correction value is not updated for a predetermined time, said correction value updating part updates said force detection value which is stored in said force detection value storage part for use as said correction value.

3. The human-interactive type robot system according to claim 1, which further forcibly makes said robot stop or operate at a fixed speed to make said correction value updating part update said correction value when said correction value is not updated for a predetermined time.

4. The human-interactive type robot system according to claim 1, further comprising:
   a human detecting part which detects if said worker is present near said robot and
   an update permitting part which permits updating of said correction value by said correction value updating part when said human detecting part detects there is no worker near said robot.

5. The human-interactive type robot system according to claim 1, further comprising a malfunction judging part which monitors if an amount of strain which a strain detection part which is included in said force sensor detects falls within a predetermined suitable range and judges that said force sensor is malfunctioning when it does not fall in said suitable range.

6. The human-interactive type robot system according to claim 1, further comprising a robot stopping part which makes said robot decelerate or stop when a force detection value after being updated by said correction value updating part exceeds a stopping threshold value.

7. A human-interactive type robot system wherein a robot and a worker share a work space to perform interactive work, comprising
   a force sensor which measures a force which said robot receives from the outside and outputs a measurement value,
   a force detection value calculating part which subtracts a correction value from said measurement value to calculate a force detection value, and
   a correction value updating part which updates a force detection value when a predetermined condition stands for use as said correction value,
   wherein, said predetermined condition being that said robot is stopped or operating at a fixed speed and said current force detection value is a force detection value threshold value or less.

8. The human-interactive type robot system according to claim 7,
   further comprising a force detection value storage part which stores a force detection value when said predetermined condition stands, and,
   when said correction value is not updated for a predetermined time, said correction value updating part updates said force detection value which is stored in said force detection value storage part for use as said correction value.

9. The human-interactive type robot system according to claim 7, which further forcibly makes said robot stop or operate at a fixed speed to make said correction value updating part update said correction value when said correction value is not updated for a predetermined time.

10. The human-interactive type robot system according to claim 7, further comprising:
    a human detecting part which detects if said worker is present near said robot and
    an update permitting part which permits updating of said correction value by said correction value updating part when said human detecting part detects there is no worker near said robot.

11. The human-interactive type robot system according to claim 7, further comprising a malfunction judging part which monitors if an amount of strain which a strain detection part which is included in said force sensor detects falls within a predetermined suitable range and judges that said force sensor is malfunctioning when it does not fall in said suitable range.

12. The human-interactive type robot system according to claim 7, further comprising a robot stopping part which makes said robot decelerate or stop when a force detection value after being updated by said correction value updating part exceeds a stopping threshold value.

13. The human-interactive type robot system according to claim 7, further comprising a force detection value threshold changing part which changes said force detection value threshold value in accordance with an elapsed time from when said correction value updating part updates said correction value.

* * * * *